(12) United States Patent
Martin et al.

(10) Patent No.: US 7,822,984 B2
(45) Date of Patent: Oct. 26, 2010

(54) PORTAL SYSTEM, METHOD AND PROGRAM, AND ASSOCIATED USER COMPUTER AND CONTENT SUPPLIER

(75) Inventors: Pablo Martinez Martin, Madrid (ES); Manuel R. Rodriguez, Madrid (ES)

(73) Assignee: International Business Machines Corporation, Armonk, NY (US)

( * ) Notice: Subject to any disclaimer, the term of this patent is extended or adjusted under 35 U.S.C. 154(b) by 1315 days.

(21) Appl. No.: 11/236,289

(22) Filed: Sep. 27, 2005

(65) Prior Publication Data

US 2006/0069917 A1    Mar. 30, 2006

(30) Foreign Application Priority Data

Sep. 27, 2004    (EP) .................................. 04300625

(51) Int. Cl.
*H04L 29/00*    (2006.01)

(52) U.S. Cl. ................. 713/175; 713/150; 713/156; 713/168; 713/173

(58) Field of Classification Search ................. 380/277, 380/44; 726/14; 713/153, 175
See application file for complete search history.

(56) References Cited

U.S. PATENT DOCUMENTS 7,240,366 B2 * 7/2007 Buch et al. .................... 726/14

| | | | |
|---|---|---|---|
| 2002/0114453 A1 * | 8/2002 | Bartholet et al. | 380/44 |
| 2002/0194502 A1 | 12/2002 | Sheth et al. | 713/201 |
| 2003/0200145 A1 * | 10/2003 | Krassner et al. | 705/14 |
| 2004/0181679 A1 | 9/2004 | Dettinger et al. | 713/193 |
| 2005/0058294 A1 * | 3/2005 | Chen et al. | 380/277 |
| 2005/0097190 A1 * | 5/2005 | Abdelhak | 709/217 |

FOREIGN PATENT DOCUMENTS

| | | |
|---|---|---|
| AU | 88755 A5 | 3/2002 |
| EP | 1317839 A2 | 6/2003 |
| JP | 2004511931 T2 | 4/2004 |
| WO | WO 02/21761 A2 | 3/2002 |
| WO | WO 02/21761 A3 | 3/2002 |
| WO | WO 2004/081816 A1 | 9/2004 |

* cited by examiner

*Primary Examiner*—Kieu Oanh Bui
*Assistant Examiner*—Helai Salehi
(74) *Attorney, Agent, or Firm*—Arthur J. Samodovitz

(57) ABSTRACT

Portal, and a method and program executed by a portal. The portal receives a data request and a public certificate from a user. The portal transmits the data request and the public certificate to a content supplier. The portal receives confidential data and non-confidential data responsive to the data request. The confidential data is received in encrypted form together with an identifier identifying the confidential data as encrypted. The non-confidential data is received in unencrypted form. The portal formats the non-confidential data in accordance with a specification previously provided by the user. The portal transmits the encrypted confidential data, the identifier and the formatted non-confidential data to the user.

20 Claims, 2 Drawing Sheets

PORTAL SYSTEM, METHOD AND PROGRAM, AND ASSOCIATED USER COMPUTER AND CONTENT SUPPLIER

TECHNICAL FIELD

The present invention relates generally to the World Wide Web ("WWW" or "Web"), and more specifically to web portals.

BACKGROUND

A web portal is a software tool that collects or aggregates information from web content suppliers and presents the combined information on a web-page or web site. A typical portal enables a user to specify (a) desired information categories (e.g. news, sport scores, weather forecasts, market figures etc.), (b) desired content suppliers (e.g. Reuters, the Weather Channel etc.) for the selected information categories, and (c) a format in which data gathered from the selected content suppliers is to be displayed. A typical portal also (i) gathers required data from selected content suppliers, (ii) constructs a front-end user-interface which integrates and formats the gathered data in accordance with the user's specifications, (iii) optionally notifies the user of the collated data, and (iv) enables the user to access the collated data through a front-end user-interface. With these functions, and others, portals provide a convenient and time-effective mechanism for users to view up-to-date information from a wide variety of content suppliers without having to visit multiple, different web sites to obtain the desired information.

If a portal receives data from content suppliers in clear text form, the portal can readily collate it, and format the data for a user in accordance with format specifications of the user. If the portal receives data from a secure content supplier in encrypted form (or otherwise unavailable in clear text form), the portal decrypts the data, and formats the data in accordance with a user's format specifications.

Transmissions of secure information to and from portals are typically conducted through two independent SSL tunnels wherein the first tunnel exists between the user and the portal and the second tunnel exists between the portal and the content supplier. A content supplier encrypts confidential information and transmits the resulting data to the portal through the second SSL channel. The portal then decrypts and re-encrypts the data before transmitting it to the user through the first SSL tunnel. Thus, the security systems employed by traditional portals do not provide complete end-to-end security because a portal accesses the confidential data passing wherethrough to decrypt and re-encrypt the data for subsequent transmission to the user. Consequently, users are often reluctant to allow such systems to collate and display sensitive information (e.g. personal banking details, utility billing information and personal e-mails) for fear that the information could be traced or accessed by a malicious or unauthorised user. Another problem with the security systems employed in traditional portals is that they may require the user to provide a password to the portal and desired secure content supplier.

Existing end-to-end secure systems for secure content suppliers (e.g. on-line banking systems) typically require users to install specifically dedicated programs on their machines before a user can obtain information from any of the secure content suppliers. Any of these programs employs the secure socket layer (SSL) protocol to connect a user's machine to a secure content supplier (e.g. bank) and obtain the required sensitive information (e.g. banking information). However, existing end-to-end secure systems do not provide the remote data collating and formatting operations of a portal. Because a portal cannot access confidential information from a secure content supplier, if a user wishes to view confidential information from a number of different secure content suppliers (for example a number of different banks or utility companies etc.) the user separately visits the web-sites of each and every supplier. Moreover, because information obtained from any secure content supplier is typically formatted in accordance with the supplier's own specifications, a user has little or no control over the format in which the information is presented to the user. In addition, if a user visits a number of different secure content suppliers, the user will received confidential information in different formats.

SUMMARY OF THE INVENTION

The present invention provides a single end-to-end secure data transmission system for a portal that extends through the entirety of a data transmission between a secure content supplier (e.g. banks, utility companies etc.) and a user thereof. The present invention leverages existing Internet technologies such as extensible mark-up language (XML) (or any other suitable mark-up language) and SSL and creates a unique encryption in the XML layer that is independent of traditional SSL encryption. In particular, the present invention encrypts XML data as an object and passes the encrypted object from a secure content supplier to a user (via a portal) through whichever encrypted or clear channels are available over the network. Accordingly, even if encrypted XML data is flowing through a network in an SSL tunnel, and decrypted by the portal (for subsequent re-encryption and transmission to the user), the encrypted XML fields are still protected in the XML package. This ensures that the encrypted XML data cannot be read by a "man-in-the-middle" hacker that receives the SSL encrypted packets and decrypts them, because the data in the decrypted SSL packet remains encrypted in the XML object.

The present invention enables a portal to format data from a secure content supplier without decrypting the sensitive information itself. Accordingly, the end-to-end secure data transmission system of the present invention enables a portal to collate a wide variety of different types of information i.e. sensitive and non-sensitive information in accordance with the requirements of the user and to integrate these different information types into a single standardised user-interface.

The present invention resides in a portal, and a method and program executed by a portal. The portal receives a data request and a public certificate from a user. The portal transmits the data request and the public certificate to a content supplier. The portal receives confidential data and non-confidential data responsive to the data request. The confidential data is received in encrypted form together with an identifier identifying the confidential data as encrypted. The non-confidential data is received in unencrypted form. The portal formats the non-confidential data in accordance with a specification previously provided by the user. The portal transmits the encrypted confidential data, the identifier and the formatted non-confidential data to the user.

The present invention also resides in a user computer and a method and program performed by a user computer to use a portal. The user's computer transmits a data request and a public certificate to the portal. The user's computer receives confidential and non-confidential data from the portal responsive to the data request. The confidential data is received in encrypted form together with an identifier identifying the confidential data as encrypted. The non-confidential data is received in unencrypted form. The user's computer decrypts the encrypted confidential data. The user's computer displays the decrypted confidential data together with the non-confidential data to the user.

The present invention also resides in a content supplier's computer, and a method and program executed by a content supplier's computer. The content supplier's computer receives a data request and a public certificate from a portal. The public certificate comprises a public key. The content supplier's computer determines that the requested data is confidential and encrypts the confidential data with the public key. The content supplier's computer combines non-confidential data in unencrypted form, the confidential data in encrypted form and an identifier identifying the encrypted confidential data as encrypted, and transmits the combined nonconfidential data, confidential data and identifier to the portal.

PREFERRED EMBODIMENTS OF THE PRESENT INVENTION

Figure 1:
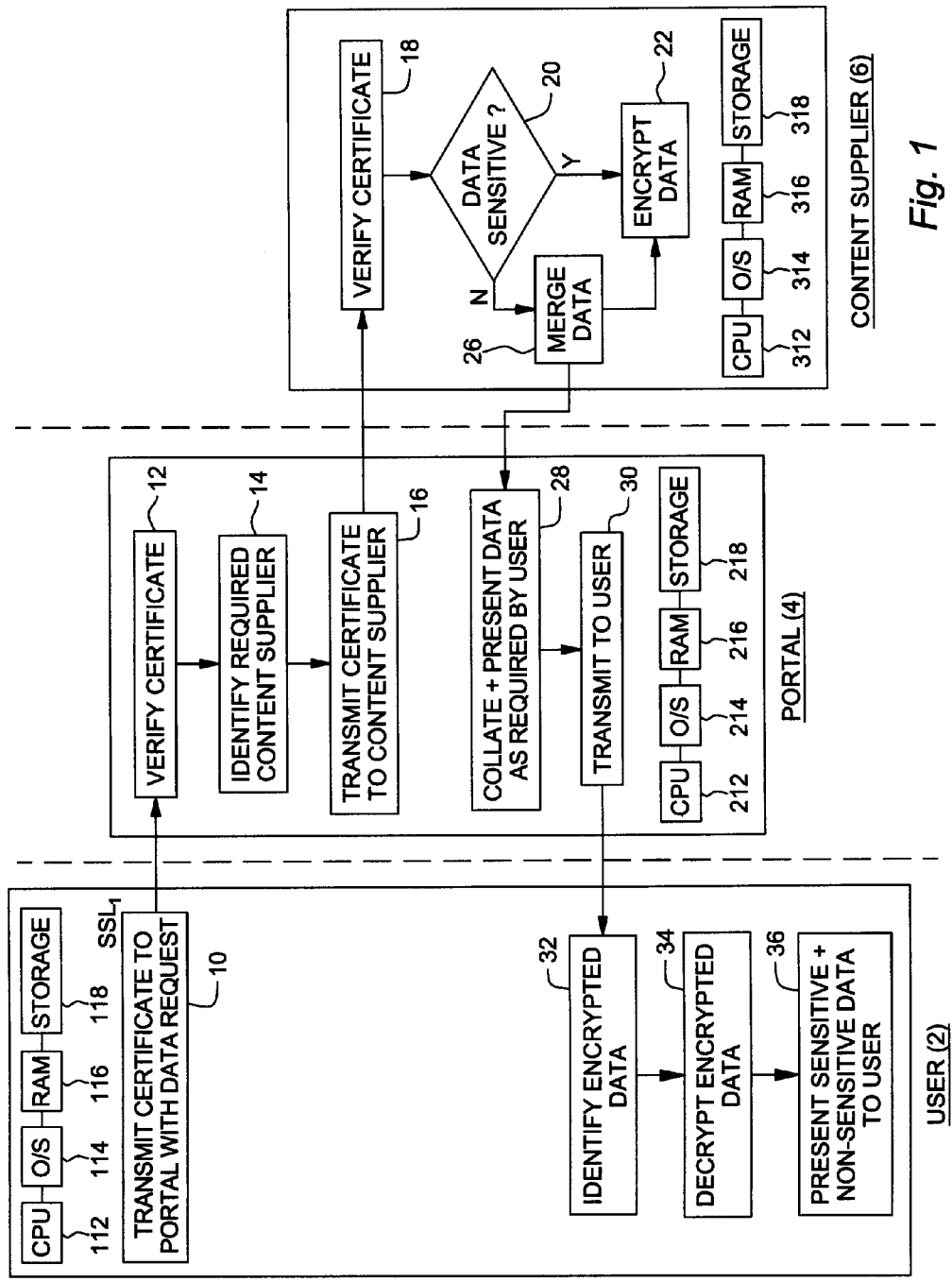
FIG. 1 is a flow chart of programming and operations performed by a user computer, portal computer and a secure content supplier computer, according to the present invention.

The present invention will now be described in detail with reference to the figures. Portals, according to the present invention, need not receive data from content suppliers in clear-text form and do not need to decrypt the data. Instead, the only information that a portal needs to receive in clear text form are instructions how particular content from a content supplier should be represented in the web-page generated by the portal. In other words, portals only need to receive and process information detailing how the data passing wherethrough should be represented and do not need to receive and process the data itself. In a first embodiment of an end-to-end secure data transmission system according to the present invention, the communications between a user, portal and secure content supplier are conducted without full SSL handshaking. In a second embodiment of an end-to-end secure data transmission system according to the present invention, the communications between a user, portal and secure content supplier employ full SSL handshaking FIG. 1 illustrates operation of the first and second embodiments of the end-to-end secure data transmission system. A user's computer 2 includes a CPU 112, an operating system 114, a random access memory 116 and a computer readable storage media 118. A web portal server 4 includes a CPU 212, an operating system 214, a random access memory 216 and a computer readable storage media 218. A content supplier/server includes a CPU 312, an operating system 314, a random access memory 316 and a computer readable storage media 318. Programming in user computer 2 is stored in storage 118 for execution by CPU 112 via random access memory 116 to perform steps 10, 32, 34, and 36 described below. Programming in web portal server 4 is stored in storage 218 for execution by CPU 212 via random access memory 216 to perform steps 12, 14, 16, 28 and 30 described below. Programming in content server 4 is stored in storage 318 for execution by CPU 312 via random access memory 316 to perform steps 18, 20, 22 and 26 described below.

End-To-End Secure Data Transmission System without Full SSL Handshaking

Before a portal can collate information on behalf of a user, the user establishes an account with the portal and selects a desired secure content supplier and information type from a portal database. The user also defines the format in which the user wishes the desired information to be presented to the user. Referring to FIG. 1, in step 10, once the user 2 has established an account with the portal 4, the user 2 can login to the portal 4 (by providing an appropriate password) and issue an information request to the portal 4. The information request includes details of the user's public certificate (containing the user's public key) and is conducted under the SSL protocol ($SSL_1$). In step 12, on receipt of an information request from the user 2, the portal 4 may or may not verify the user's public certificate. In step 14, the portal 4 determines the user's preferred content suppliers 6 from the user's account details. For the sake of simplicity, in the present example it will be assumed that the user 2 has designated only one preferred content supplier 6. However, it should be understood that the user 2 may designate as many preferred content suppliers 6 as permitted by the portal's software. In the event that the user 2 selects multiple preferred content suppliers 6, the procedure described below will apply to each of the designated preferred content suppliers 6.

In step 16, the portal 4 establishes a connection under the SSL protocol ($SSL_2$) to the user's preferred content supplier 6 and transmits the user's public certificate to the content supplier 6 together with a request for the information required by the user 2. In step 18, upon receipt of the information request and the user's public certificate from the portal 4, the content supplier 6 verifies the user's public certificate. In step 20, once the user's public certificate has been verified, the content supplier 6 determines whether or not the required information is confidential in nature. In the event that the required content information is sensitive, in step 22, the content supplier 6 encrypts the content information and packages the resulting data with meta-data specifying the format and data type of the encrypted information. In the event that the required content information is not sensitive, the content supplier 6 does not encrypt the data. In step 26, the content supplier 6 merges the encrypted confidential data and the unencrypted non-confidential data and transmits the resulting data to the portal 4 through the SSL channel ($SSL_2$).

In step 28, upon receipt of the data from the content supplier 6, the portal 4 produces a presentation of the data by collating and formatting all the data in accordance with the user's specifications. The portal 4 inserts the encrypted confidential data as received from the content supplier 6 into the above presentation together with standardised HTML/XML (or other mark-up language) tags to designate the security status of the data. In step 30, the portal 4 transmits the presentation to the user 2. In step 32, upon receipt of the presentation from the portal 4, a plug-in tool in the user's browser detects the HTML/XML tags in the presentation that identify the presence of encrypted sensitive data therein. In step 34, the browser's plug in tool then decrypts the sensitive data with the user's private key (stored on the user's machine). In step 36, the plug-in tool in the user's browser includes the decrypted information in the above presentation of the rest of the collated information.

End-To-End Secure Data Transmission System with Full SSL Handshaking

The SSL protocol provides an option wherein both a client can verify itself to a server and the server can verify itself to the client. This is known as a complete or full handshake. The second embodiment of the end-to-end secure data transmission system employs the full handshaking SSL option to enable a portal 4 to verify the identity of a user 2 (through the user's public certificate) and the user 2 to verify the identity of the portal 4 (through the portal's public certificate). This establishes a completely secure communication channel between the user 2 and the portal 4 that does not require the use of any login passwords or user names by the user 2. Once the user 2 has established the secure communication channel with the portal 4, the rest of operations of the end-to-end secure data transmission system proceed as described for the first embodiment.

How Portal/Content Aggregator Recognises Encrypted Information

Referring again to steps 24 and 26 in FIG. 1, the information transmitted by the content supplier 6 to the portal 4 may contain confidential and non-confidential material. Accordingly, before a content supplier 6 transmits any information to the portal 4, the content supplier 6 enables the portal 4 to identify any confidential elements in the information. A simple analogy of a communication between three people is used below to explain how the content supplier 6 transmits confidential and non-confidential information to the user 2 through the portal 4. In this example, there are three people Alice, Bob and Caroline, wherein Alice lives in a first country (e.g. Spain), Caroline lives in a second country (e.g. Ireland) and Bob frequently travels between the Ireland and Spain to deliver mail between the two countries. Also in this example, Alice asks Bob to bring her a letter from Caroline. In this case, Bob goes to Caroline and asks for a letter to Alice. Caroline writes the letter and puts it inside an envelope. However, because Bob is delivering several letters to Spain, Caroline must provide detailed delivery instructions to Bob (e.g. Caroline must provide Alice's address details). Thus, whilst Bob can deliver the letter to Alice, he cannot read the letter because it is inside the envelope.

Referring to the present end-to-end secure data transmission system, any confidential elements of the information transmitted by the content supplier 6 to the user 2 are transmitted to the portal 4 in encrypted form (i.e. can only be accessed by the user 2). Similarly, any non-confidential elements of the information are transmitted to the portal 4 in clear text form (i.e. can be accessed by the portal 4). Nevertheless, the portal 4 needs to distinguish between the encrypted and clear text data because the portal 4 is responsible for formatting the data in accordance with the user's specifications before the data can be sent to the user 2. Accordingly, before the content supplier 6 transmits data to the portal 4, the content supplier 6 tags the different elements of the data, identifying them as being confidential or non-confidential, as the case may be. This tagging is explained in more detail by the following example. The tags employed in the following example are fictitious and serve only to explain the principles of the tagging operation. Accordingly, it will be realized that the present invention should not be limited to the tags mentioned in the following example.

For the purpose of this example, assume that a bank is informing a user of the user's current balance as follows:

```
<balance>
    your balance is
        <money> 11,343.00 $ </money>
</balance>
```

However, because the above information is sensitive in nature, the information should not be freely accessible to anyone apart from the user/depositor. Accordingly, the bank should encrypt the above message and actually transmit a message such as that shown below:

```
<balance>
    your balance is
        <encrypted>
            wetoihdkeew2refsfoa9wewet
        </encrypted>
</balance>
```

In this case, the end user should be the only entity capable of decrypting "wetoihdkeew2refsfoa9wewet"

However, because the portal 4 is responsible for formatting any collated data in accordance with the specifications of the user, the portal 4 requires meta information detailing the format of the data in its unencrypted form. Consequently, the bank should transmit to the portal 4 a message such as that shown below:

```
<balance>
    your balance is
        <encrypted>
            wetoihdkeew2refsfoa9wewet
            <dataformat>5.2f</dataformat>
        </encrypted>
</balance>
```

In this case the message transmitted by the secure information source to the portal 4 comprises:

(a) Non-confidential data (i.e. "Your balance is") clear text/human language descriptive form:

(b) Confidential data in encrypted form (i.e. wetoihdkeew2refsfoa9wewet); and (c) Meta Information for the portal 4 (specifying for example, the format of the unencrypted confidential data (i.e. 5.2f, which indicates that the confidential data comprises a floating point number with five digits and two digits before and after the decimal point respectively)).

When the portal 4 receives this information, it transforms most of the tags into HTML. However, because the portal 4 does not have access to the confidential information in the message, the portal 4 does not convert the encrypted data into HTML. When the end-user's browser accesses the above HTML code, it detects the <encrypted> tag in the HTML code and decrypts the relevant encrypted data with the user's private key stored on the machine. Accordingly, the end-user's browser transforms <encrypted wetoihdkeew2refsfoa9wewet</encrypted> into a parameter name and a data value for the parameter, i.e. <money> 11,343.00 $ </money> which can be shown on the user's screen.

"Man-In-The Middle" Hacking Attack

Figure 2:
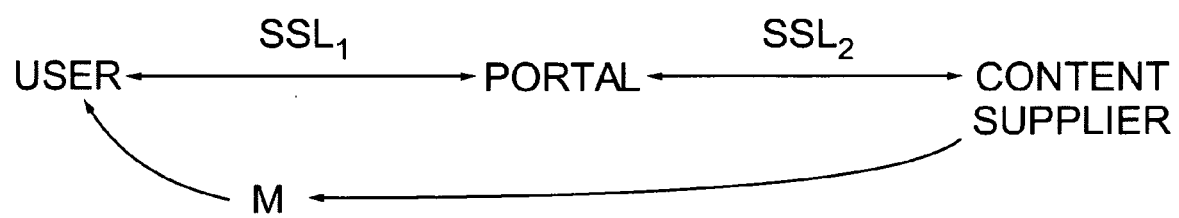
FIG. 2 shows a "man-in-the-middle" attempting to hack a content transmission utilizing the present invention including the portal computer of FIG. 1.

Referring to FIG. 2, in the present end-to-end secure data transmission system, a portal 4 transmits a user's information request to a content supplier 6 together with the user's public certificate, which comprises the user's SSL public key signed by an authorized third party (e.g. Verisign). If an unauthorized person "M" attempts to intercept the communication from the content supplier and substitute his or her public key for the user's, M's public key would not be signed by the authorized third party. Accordingly, upon receipt of the information, the user's browser issues an alarm indicating that the communication has been intercepted.

The programming within the user computer illustrated in FIG. 1 can be loaded into the user computer from a computer readable medium such as a magnetic disk or tape, optical disk, or DVD. The programming within the portal computer illustrated in FIG. 1 can be loaded into the portal computer from a computer readable medium such as a magnetic disk or tape, optical disk, or DVD. The programming within the content supplier computer illustrated in FIG. 1 can be loaded into the content supplier computer from a computer readable medium such as a magnetic disk or tape, optical disk, or DVD.

While the present invention has been described in terms of SSL transmission channels between the user's machine, portal and content supplier, the invention could also be implemented with other secure transmission channels and as such should not be limited to the SSL channels specifically mentioned in the description. Also, while the above invention is described in terms on an XML implementation, other suitable mark-up languages could also be used. Consequently, the present invention is not limited to an XML implementation. Modifications and alterations may be made to the above without departing from the scope of the invention.

What is claimed is:

1. A method for processing requests from a user for information from a content server, said method comprising the steps of:
    a web portal server receiving from the user a specification of a format requested by said user for nonconfidential information obtained by said web portal server from the content server on behalf of said user, said web portal server storing said specification received from said user;
    said web portal server receiving an information request and a public certificate from said user via a client computer coupled to said web portal server via a network;
    said web portal server sending said information request and said public certificate to said content server via a network;
    in response to said information request, said web portal server receiving from said content server nonconfidential information in unencrypted form and confidential information in encrypted form, the confidential, encrypted information including a parameter name and a data value for said parameter, the nonconfidential, unencrypted information including (a) a nonconfidential human language description of said parameter, (b) a nonconfidential description of a format of an unencrypted form of said data value, (c) a first pair of first mark-up language tags identifying said confidential information as encrypted, and (d) a second pair of second mark-up language tags identifying said nonconfidential information as unencrypted;
    said web portal server identifying said nonconfidential information based on said second pair of tags and in response, formatting said nonconfidential information based on said specification received from said user, and forwarding to said client computer a markup language representation of said nonconfidential, unencrypted information formatted based on said specification received from said user and said confidential, encrypted information.

2. A method as set forth in claim 1 further comprising the step of said web portal server verifying an identity of said user before the step of said web portal server sending said information request and said public certificate to said content server via said network.

3. A method as set forth in claim 1 wherein the web portal server sends said confidential, encrypted data to said client computer without formatting said confidential, encrypted information in accordance with said specification received from said user.

4. The method set forth in claim 1 further comprising the subsequent steps of:
    said client computer decrypting said confidential, encrypted information received from said web portal server;
    said client computer formatting the data value in the decrypted confidential information based on said nonconfidential description of said format of said unencrypted form of said data value; and
    said client computer displaying the formatted, nonconfidential information received from said web portal server and the formatted, decrypted data.

5. The method set forth in claim 4 wherein said client computer decrypts said confidential, encrypted information received from said web portal server, based on a private key previously stored at said client computer.

6. The method set forth in claim 1 further comprising the subsequent steps of:
    said client computer decrypting said confidential, encrypted information received from said web portal server; and
    said client computer formatting the data value in the decrypted confidential information based on said nonconfidential description of said format of said unencrypted form of said data value, and said client computer associating the formatted, decrypted data value with the nonconfidential human language description of said parameter; and
    said client computer displaying the formatted, nonconfidential information received from said web portal server and the formatted, decrypted data value in association with the nonconfidential human language description of said parameter such that in the display the nonconfidential human language description of said parameter describes a type of said formatted, decrypted data value.

7. The method set forth in claim 1 wherein said web portal server does not apply said specification received from said user to said confidential, encrypted information received from said content server.

8. A computer program product for processing requests from a user for information from a content server, said computer program product comprising:
    a computer readable storage media;
    first program instructions, for execution in a web portal server, to receive from the user a specification of a format requested by said user for nonconfidential information obtained by said web portal server from the content server on behalf of said user, said first program instructions initiating storage of said specification received from said user;

second program instructions, for execution in said web portal server, to receive an information request and a public certificate from said user via a client computer coupled to said web portal server via a network;

third program instructions, for execution in said web portal server, to initiate sending of said information request and said public certificate to said content server via a network;

fourth program instructions, for execution in said web portal server, to receive from said content server nonconfidential information in unencrypted form and confidential information in encrypted form, the confidential, encrypted information including a parameter name and a data value for said parameter, the nonconfidential, unencrypted information including (a) a nonconfidential human language description of said parameter, (b) a nonconfidential description of a format of an unencrypted form of said data value, (c) a first pair of first mark-up language tags identifying said confidential information as encrypted, and (d) a second pair of second mark-up language tags identifying said nonconfidential information as unencrypted;

fifth program instructions, for execution in said web portal server, to identify said nonconfidential information based on said second pair of tags and in response, format said nonconfidential information based on said specification received from said user, and forward to said client computer a markup language representation of said nonconfidential, unencrypted information formatted based on said specification received from said user and said confidential, encrypted information; and wherein said first, second, third, fourth and fifth program instructions are stored on said computer readable storage media.

9. The computer program product set forth in claim 8 further comprising sixth program instructions, for execution in said web portal server, to verify an identity of said user before said third program instructions initiate sending of said information request and said public certificate to said content server via said network; and wherein said sixth program instructions are stored on said computer readable storage media.

10. The computer program product set forth in claim 8 further comprising sixth program instructions, for execution in said web portal server, to initiate sending of said confidential, encrypted data to said client computer without formatting said confidential, encrypted information in accordance with said specification received from said user; and wherein said sixth program instructions are stored on said computer readable storage media.

11. The computer program product set forth in claim 8 further comprising:

sixth program instructions, for execution in said client computer, to decrypt said confidential, encrypted information received from said web portal server;

seventh program instructions, for execution in said client computer, to format the data value in the decrypted confidential information based on said nonconfidential description of said format of said unencrypted form of said data value; and eighth program instructions, for execution in said client computer, to initiate display of the formatted, nonconfidential information received from said web portal server and the formatted, decrypted data; and wherein said sixth, seventh and eighth program instructions are stored on said computer readable storage media.

12. The computer program product set forth in claim 11 wherein said sixth program instructions decrypt said confidential, encrypted information received from said web portal server, based on a private key previously stored at said client computer.

13. The computer program product set forth in claim 8 further comprising:

sixth program instructions, for execution in said client computer, to decrypt said confidential, encrypted information received from said web portal server;

seventh program instructions, for execution in said client computer, to format the data value in the decrypted confidential information based on said nonconfidential description of said format of said unencrypted form of said data value, and associate the formatted, decrypted data value with the nonconfidential human language description of said parameter; and eighth program instructions, for execution in said client computer, to initiate display of the formatted, nonconfidential information received from said web portal server and the formatted, decrypted data value in association with the nonconfidential human language description of said parameter such that in the display the nonconfidential human language description of said parameter describes a type of said formatted, decrypted data value; and wherein said sixth, seventh and eighth program instructions are stored on said computer readable storage media.

14. A computer system for processing requests from a user for information from a content server, said computer system comprising:

a CPU in a web portal server, a computer readable memory in said web portal server, and a computer readable storage media in said web portal server;

first program instructions to receive from the user a specification of a format requested by said user for nonconfidential information obtained by said web portal server from the content server on behalf of said user, said first program instructions initiating storage of said specification received from said user;

second program instructions to receive an information request and a public certificate from said user via a client computer coupled to said web portal server via a network;

third program instructions to initiate sending of said information request and said public certificate to said content server via a network;

fourth program instructions to receive from said content server nonconfidential information in unencrypted form and confidential information in encrypted form, the confidential, encrypted information including a parameter name and a data value for said parameter, the nonconfidential, unencrypted information including (a) a nonconfidential human language description of said parameter, (b) a nonconfidential description of a format of an unencrypted form of said data value, (c) a first pair of first mark-up language tags identifying said confidential information as encrypted, and (d) a second pair of second mark-up language tags identifying said nonconfidential information as unencrypted;

fifth program instructions to identify said nonconfidential information based on said second pair of tags and in response, format said nonconfidential information based on said specification received from said user, and forward to said client computer a markup language representation of said nonconfidential, unencrypted information formatted based on said specification received from said user and said confidential, encrypted information; and wherein said first, second, third, fourth and fifth program instructions are stored on said computer readable storage media for execution by said CPU via said computer readable memory.

15. The computer system set forth in claim 14 further comprising sixth program instructions to verify an identity of said user before said third program instructions initiate sending of said information request and said public certificate to said content server via said network; and wherein said sixth program instructions are stored on said computer readable storage media for execution by said CPU via said computer readable memory.

16. The computer system set forth in claim 14 further comprising sixth program instructions to initiate sending of said confidential, encrypted data to said client computer without formatting said confidential, encrypted information in accordance with said specification received from said user; and wherein said sixth program instructions are stored on said computer readable storage media for execution by said CPU via said computer readable memory.

17. The computer system set forth in claim 14 further comprising:

a second CPU in said client computer, a second computer readable memory in said client computer, and a second computer readable storage media in said client computer;

sixth program instructions to decrypt said confidential, encrypted information received from said web portal server;

seventh program instructions to format the data value in the decrypted confidential information based on said nonconfidential description of said format of said unencrypted form of said data value; and eighth program instructions to initiate display of the formatted, nonconfidential information received from said web portal server and the formatted, decrypted data; and wherein said sixth, seventh and eighth program instructions are stored on said second computer readable storage media for execution by said second CPU via said second computer readable memory.

18. The computer system set forth in claim 17 wherein said sixth program instructions decrypt said confidential, encrypted information received from said web portal server, based on a private key previously stored at said client computer.

19. The computer system set forth in claim 14 further comprising:

a second CPU in said client computer, a second computer readable memory in said client computer, and a second computer readable storage media in said client computer;

sixth program instructions to decrypt said confidential, encrypted information received from said web portal server;

seventh program instructions to format the data value in the decrypted confidential information based on said nonconfidential description of said format of said unencrypted form of said data value, and associate the formatted, decrypted data value with the nonconfidential human language description of said parameter; and eighth program instructions to initiate display of the formatted, nonconfidential information received from said web portal server and the formatted, decrypted data value in association with the nonconfidential human language description of said parameter such that in the display the nonconfidential human language description of said parameter describes a type of said formatted, decrypted data value; and wherein said sixth, seventh and eighth program instructions are stored on said second computer readable storage media for execution by said second CPU via said second computer readable memory.

20. The computer system set forth in claim 14 wherein said web portal server does not apply said specification received from said user to said confidential, encrypted information received from said content server.

* * * * *